(12) United States Patent
Belson et al.

(10) Patent No.: US 7,646,183 B2
(45) Date of Patent: Jan. 12, 2010

(54) ADJUSTING AN OUTPUT VOLTAGE OF A CONVERTER BASED ON CURRENT CONSUMPTION

(75) Inventors: Steven A. Belson, Plano, TX (US); Bradley D. Winick, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 591 days.

(21) Appl. No.: 11/141,341

(22) Filed: May 31, 2005

(65) Prior Publication Data

US 2006/0267563 A1 Nov. 30, 2006

(51) Int. Cl.
*G05F 1/00* (2006.01)
(52) U.S. Cl. .................................. 323/282; 323/284
(58) Field of Classification Search ................. 323/266, 323/282, 284, 283, 224; 363/15, 34
See application file for complete search history.

(56) References Cited

U.S. PATENT DOCUMENTS

| | | | |
|---|---|---|---|
| 6,774,612 B1 | 8/2004 | Ballenger et al. | |
| 6,954,054 B2* | 10/2005 | Brown | 323/283 |
| 2002/0196004 A1* | 12/2002 | Berson et al. | 323/282 |
| 2003/0020442 A1* | 1/2003 | Hwang | 323/288 |
| 2003/0234635 A1 | 12/2003 | Currelly et al. | |
| 2004/0174146 A1 | 9/2004 | Leman | |
| 2005/0029998 A1* | 2/2005 | Brachmann et al. | 323/283 |
| 2006/0087303 A1* | 4/2006 | Hartular et al. | 323/283 |

OTHER PUBLICATIONS

Summit Microelectronics, Inc., Application Note 39, "SMM 105/205/605/665 ADOC Tutorial and Performance Summary," pp. 1-11, Jun. 19, 2003.
Jaycar Electronics Reference Data Sheet: DCDCCONV.PDF(1), "DC-DC Converters: A Primer," pp. 1-5 (2001).
Dallas Semiconductor Maxim, "DC-DC Converter Tutorial," http://www.maxim-ic.com/appnotes.cfm/appnote_number/710, pp. 1-8, Oct. 19, 2000.

* cited by examiner

*Primary Examiner*—Bao Q Vu
*Assistant Examiner*—Nguyen Tran

(57) ABSTRACT

A system includes a converter to convert an input voltage to an output voltage, where the converter has an adjustment input. The system further includes a voltage adjustment logic to receive an indication of an electrical current consumed by a load, with the voltage adjustment logic being responsive to the indication of the consumed electrical current to provide a control indication to the adjustment input of the converter to adjust the output voltage from the converter.

24 Claims, 3 Drawing Sheets

ADJUSTING AN OUTPUT VOLTAGE OF A CONVERTER BASED ON CURRENT CONSUMPTION

BACKGROUND

Power to various components of an electronic system, such as a computer system or other type of electronic system, is provided by a power supply in the electronic system. The power supply includes a power source, which can include an alternating current (AC) source, such as that provided by wall power outlets. Typically, the AC power source is provided to an input of an AC power adapter or AC/DC power supply, which converts the AC input to a direct current (DC) output voltage provided to an electronic system. Another type of power source for an electronic system is a battery, which provides one or more output DC voltages for the electronic system.

The power supply of an electronic system also includes one or more DC-DC converters for converting an input DC voltage (such as that provided by a battery or by the AC power adapter or AC/DC power supply) to one or more output (usually different) DC voltages that are used to power the components of the electronic system.

Some DC-DC converters include a pulse-width modulation (PWM) circuit that controls the duty cycle of a switch in the converter to regulate the output DC voltage. The duty cycle of the switch refers to the amount of time that the switch is on versus the amount of time that the switch is off. For example, a 10% duty cycle means that the switch is on 10% of the time and off 90% of the time. Typically, the PWM circuit of the converter varies the duty cycle of the switch in response to fluctuations in the output DC voltage of the converter. By adjusting the duty cycle, more or less energy can be delivered so that the output voltage can be increased or decreased as appropriate.

The output DC voltage from the converter at a load is fed back into a sense input of the converter (in a converter's voltage loop), so that the converter is able to detect the output voltage at the load. Variations in a load condition can cause the output DC voltage to vary. In response to variations in the sensed voltage at the sense input, appropriate adjustments can be made in the converter to maintain the output voltage at the load within desired limits. As noted above, the output voltage from the converter can be adjusted by varying the duty cycle of the PWM circuit.

The converter voltage loop described above adjusts for variations in the output DC voltage at the load is a relatively slow process (usually 2-3 microseconds). As a result, the converter may not be able to compensate for variations in the output voltage in a timely manner. The result may be dips or spikes in the output DC voltage at the load, which can cause certain components to fail or experience errors. As supply voltages to low-voltage components, such as application-specific integrated circuit (ASIC) devices, field programmable gate array (FPGA) devices, and so forth, continue to decrease (such as to 1.5 volts or lower), even small variations in a converter output DC voltage can cause errors in the low-voltage components.

The regulation of the output DC voltage at the load is also dependent upon the accuracy in the initial set point of the converter. The initial set point refers to the intended or designed output voltage level of the converter under specified load conditions, usually controlled by the sense inputs of the converter.

DETAILED DESCRIPTION

Figure 1:
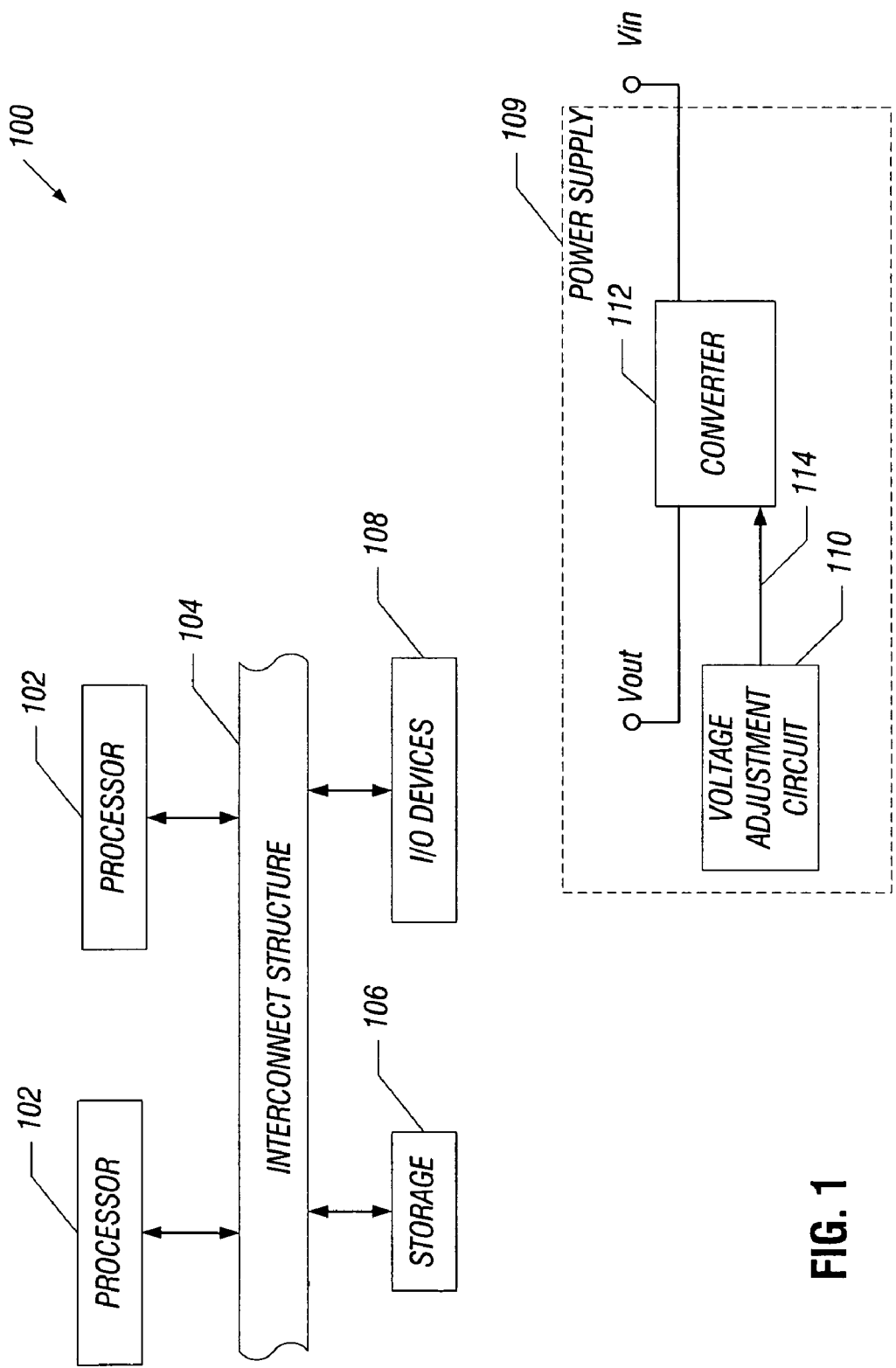
FIG. 1 is a block diagram of an example system that incorporates an embodiment of the invention.

FIG. 1 illustrates an example system 100, such as a computer system or other type of electronic device. The system 100 includes processors 102 that are connected to an interconnect structure 104 (e.g., bus, point-to-point links, printed circuit board, etc.). Although two processors are depicted in FIG. 1, an alternative implementation can use a smaller or larger number of processors. A storage 106 is also connected to the interconnect structure 104, with the storage 106 including memory devices and/or persistent storage devices (such as hard disk drives, optical drives, and so forth). One or more input/output (I/O) devices 108 can also be connected to the interconnect structure 104.

In other embodiments, other arrangements of the system 100 can be employed.

The system 100 also includes a power supply 109 that includes a DC-DC converter 112 that receives an input DC voltage (at a Vin pin) and produces (through a Vout pin) an output DC voltage for powering components in the system 100. As used here, the term "output DC voltage" or "output voltage" from the converter refers to the output DC voltage or output voltage at the load. The load includes one or more components of the system, such as the processors 102, storage 106, I/O devices 108, or other devices. The output voltage "at the load" refers to the output voltage at a location in the proximity of the load or even at the load itself. The output voltage is carried by a conductive line (such as through a printed circuit board), which is associated with some impedance. As a result, under changing load conditions, the output voltage in the conductive line near the Vout pin of the converter 112 may be different from the output voltage on the conductive line in the proximity of the load.

Although only one output DC voltage is depicted as being provided by the converter 112, it is contemplated that the converter 112 can produce additional output DC voltages for powering the various components of the system 100. Also, it is contemplated that the power supply 109 can include multiple DC-DC converters.

In accordance with some embodiments of the invention, a voltage adjustment circuit 110 is also provided in the power supply 109, where the voltage adjustment circuit 110 provides a control indication 114 to an adjustment input of the converter 112 for controlling the voltage level of the output DC voltage at the load. The "adjustment input" of the converter 112 refers to an input of the converter 112 that is used for adjusting the output voltage of the converter 112. As discussed further below, one embodiment of the adjustment input is the Trim input (also referred to as the "output voltage adjust" input) of the converter 112. However, in other embodiments, another adjustment input of the converter 112 can be used.

During operation, the load condition can vary, which can cause fluctuations in the output DC voltage at the load. The term "load condition" refers to the amount of current that is being consumed by the load at a given time. During high-activity periods of the system 100, the amount of current that is consumed by the load is typically higher than the amount of current that is consumed during low-activity periods.

Conventionally, the converter 112 relies upon a feedback loop through a sense input of the converter 112 to adjust for fluctuations in the output DC voltage. The sense input of the converter detects voltage level fluctuations of the DC output voltage at the load. In response to detecting the change in voltage level at the output DC voltage at the load, the converter either increases or decreases the amount of energy provided to the output DC voltage (such as by varying the duty cycle of a switch in the converter) to regulate the output DC voltage level within a desired range. The conventional feedback loop is typically a relatively slow process that may not adequately regulate output DC voltage at the load under fast fluctuating load conditions.

To provide for a quicker response at the converter 112 to compensate for variations in the load condition, the voltage adjustment circuit 110 according to some embodiments receives an indication of the current consumed by the load that the output DC voltage is connected to. Fluctuations in electrical current consumed by the load can be detected more quickly than fluctuations in the output DC voltage at the load. A change in the electrical current in response to a changing load condition occurs slightly prior to a change in the voltage level of the output DC voltage. The earlier change of the current is due to faster response time of the current loop as compared to the voltage loop. In other words, the voltage loop is more bandwidth limited than the current loop.

In response to detecting a change in the electrical current consumed by the load, the voltage adjustment circuit 110 can quickly provide the control indication 114 to the converter 112 for adjusting the output DC voltage at the load. By using the voltage adjustment circuit 110 that detects a change in electrical current, rather than a change in the voltage level of the output DC voltage at the load, a faster response time can be achieved at the converter 112 for regulating the output DC voltage within a target voltage range.

Figure 2:
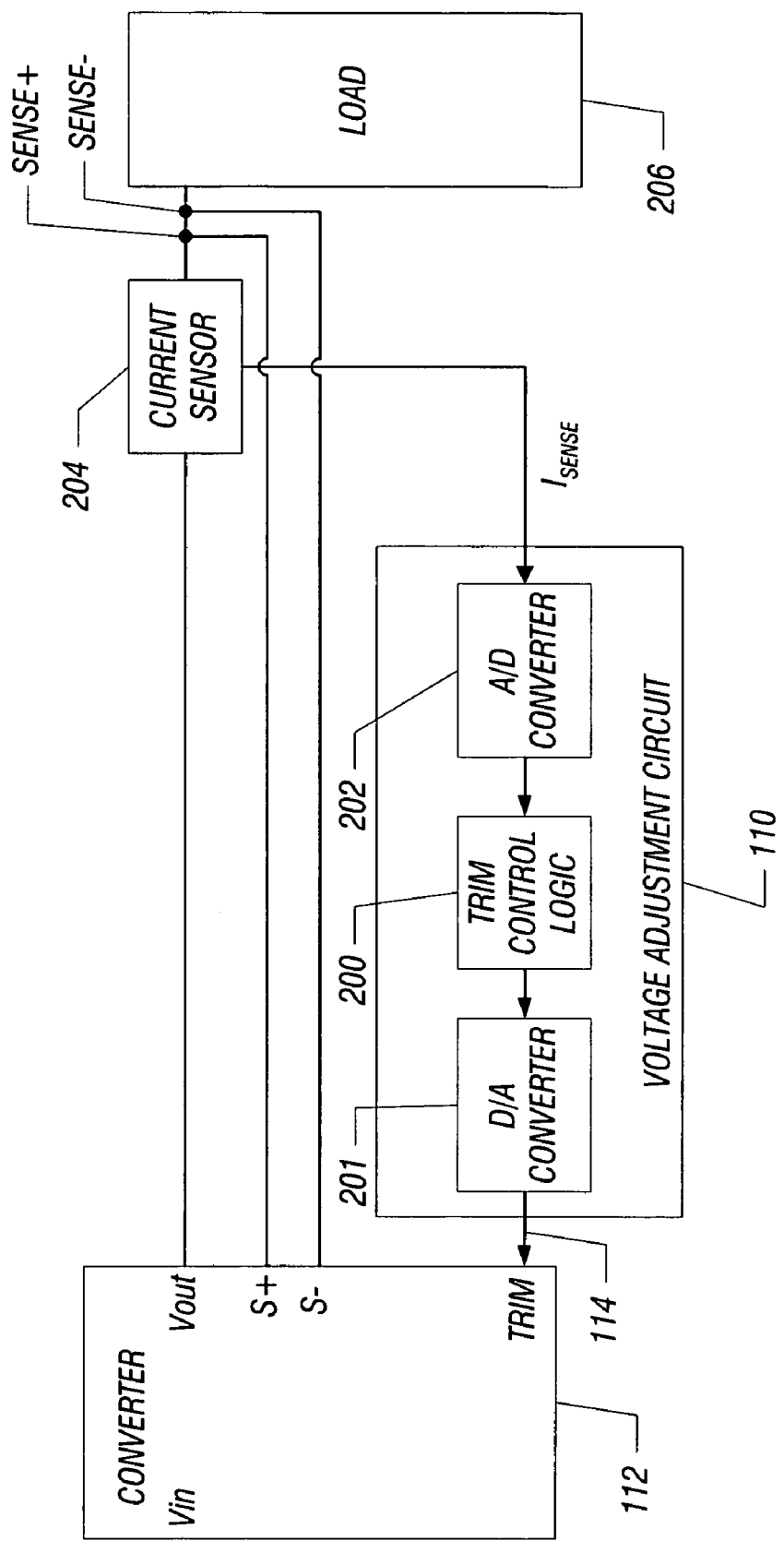
FIG. 2 is a block diagram of circuitry including a converter and a voltage adjustment circuit according to an embodiment used in the system of FIG. 1.

FIG. 2 is a more detailed depiction of circuitry according to an embodiment of the invention. The voltage adjustment circuit 110 includes a trim control logic 200, an analog-to-digital (A/D) converter 202, and a digital-to-analog (D/A) converter 201. The trim control logic 200 generates a digital indication that is provided to the D/A converter 201. The digital indication is converted by the D/A converter to the control indication 114, which is provided to the Trim input of the converter 112. According to an embodiment, the control indication 114 is an analog voltage that is varied under control of the trim control logic 200 for regulating a set point of the output DC voltage at the load.

In FIG. 2, the output DC voltage at the load is represented by a SENSE+ point and/or SENSE− point. The A/D converter 202 receives a signal $I_{sense}$ from a current sensor 204. The signal $I_{sense}$ is an analog signal that represents the amount of current consumed by a load 206, which includes one or more of the devices in the system 100, such as the devices depicted in FIG. 1 or other devices. The current sensor 204 measures the amount of current that flows to the load 206, and in response, generates an indication of the electrical current consumed by the load 206. In the implementation depicted in FIG. 2, the indication of the electrical current consumed by the load 206 is in the form of the signal $I_{sense}$, which is received by the A/D converter 202.

The converter 112, according to some embodiments, is an off-the-shelf converter that can be used in the power supply 109 of the system 100 (FIG. 1) without any changes. The ability to use off-the-shelf converters according to some embodiments allows for reduced costs associated with manufacturing the system 100. In alternative embodiments, custom converters can also be used.

Converters typically include a Trim input as well as a sense plus (S+) input, and optionally a sense minus (S−) input. The Trim input of the converter 112 is typically used for varying the set point of the output voltage at the Vout pin of the converter. The set point refers to the desired output voltage of the converter under a specified load condition.

The S+ input of the converter 112 is part of a voltage feedback loop, with the output voltage at the SENSE+ point being routed back to the S+ input to enable the converter 112 to detect changes in the voltage level of the output voltage at the load 206. Another optional part of the voltage feedback loop is the electrical connection between the SENSE− point and the S− input of the converter 112. Fluctuations in the output voltage at the SENSE+ point and/or SENSE− point is detected and compensated for in the converter 112 by varying duty cycles within the converter to apply different energies to Vout. In some converters 112, a duty cycle refers to the duty cycle of a switch in the converter controlled by a pulse-width modulation (PWM) circuit. The switch in the converter is turned on and off by the PWM circuit to adjust the amount of energy delivered to the output voltage from the converter for the purpose of increasing or decreasing the voltage level.

According to some embodiments, the voltage adjustment circuit 110 detects the amount of current consumed by the load 206, based on receiving the $I_{sense}$ signal. The A/D converter 202 converts the analog input ($I_{sense}$) into a digital value that is provided to the trim control logic 200. Example implementations of the trim control logic 200 include field programmable gate array (FPGA) devices, application-specific integrated circuit (ASIC) devices, microcontrollers, or other types of control devices. In yet another implementation, the voltage adjustment circuit 110 can be implemented in a digital signal processor (DSP). Alternatively, the trim control logic 200 can be implemented with discrete logic devices. The trim control logic 200 controls the control indication 114 (e.g., an analog voltage signal) through the D/A converter 201 based on the output from the A/D converter 202. Also, the trim control logic 200 is aware of the desired nominal output voltage (Vout) of the converter 112. Information pertaining to the desired nominal output voltage of the converter 112 can be stored in a storage location in the trim control logic 200. The voltage level of the control indication 114 is based on the current consumption represented by $I_{sense}$ and on the desired nominal output voltage. An increase in $I_{sense}$ will cause the trim control logic 200 to increase the voltage level of the control indication 114 to increase the set point for Vout (in other words, the voltage level at Vout is increased by increasing the set point because of increased current consumption at the load 206). Increasing the output voltage at the Vout pin due to increased electrical current compensates for the anticipated dip in the output voltage at the load due to the increased current consumption, which enables the converter 112 to maintain the output DC voltage within a target voltage range.

On the other hand, detection of decreasing electrical current consumption at the load 206 will cause the trim control logic 200 to decrease the voltage set point by reducing the voltage of the control indication 114.

As discussed above, the Trim input of the converter 112 is one type of adjustment input of the converter for adjusting the output DC voltage. In other embodiments, the control indication 114 from the voltage adjustment circuit 110 can be provided to another adjustment input of the converter 112.

In either case, the enhanced response time for regulating converter output voltage is based on the fact that the voltage adjustment circuit 110 checks for variations in current consumption by the load 206, rather than for variations of the output DC voltage at the load.

Figure 3:
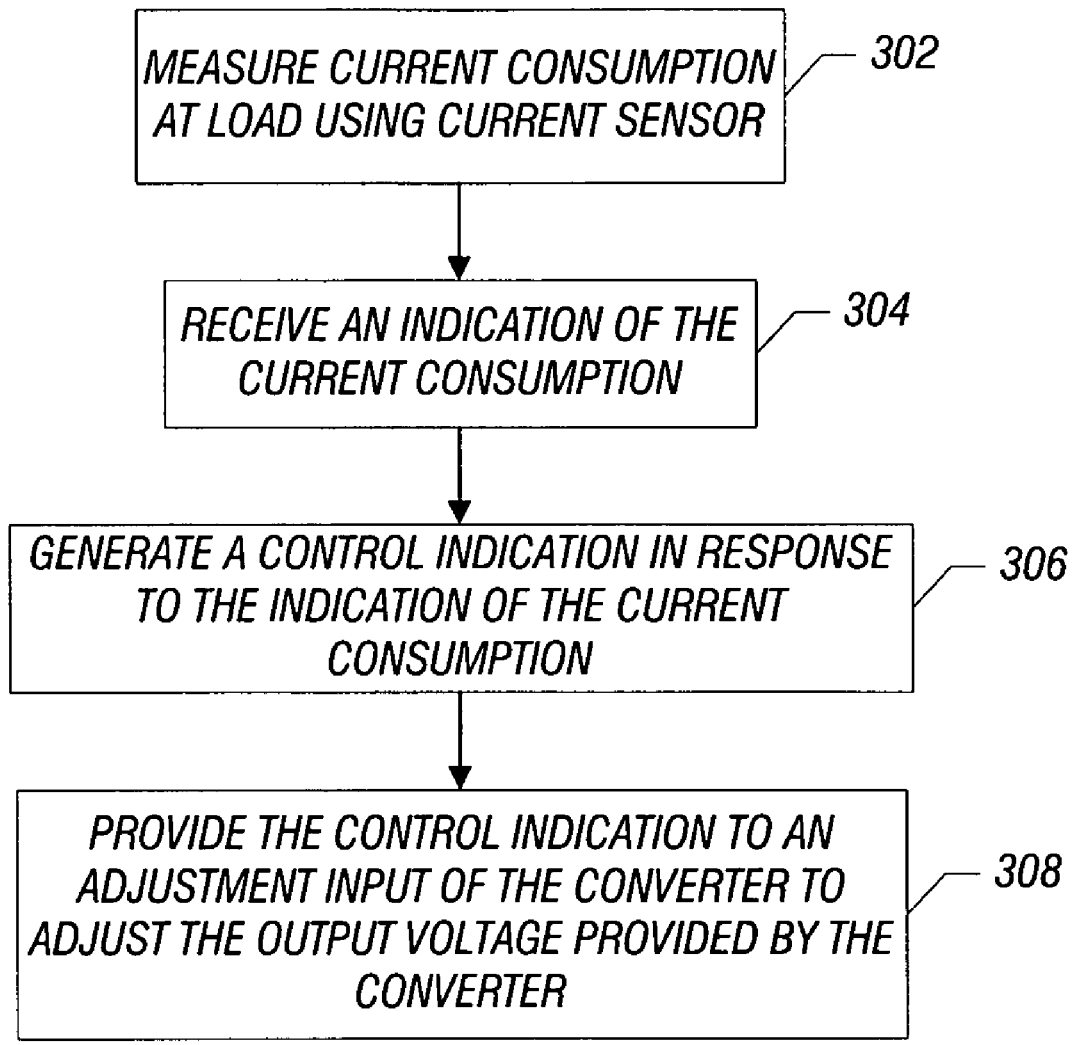
FIG. 3 is a flow diagram of a converter output voltage regulation process according to an embodiment of the invention.

FIG. 3 shows a flow diagram for regulating an output voltage of the converter 112 (FIG. 2) according to an embodiment. The current sensor 204 (FIG. 2) measures (at 302) current consumption at the load 206. The voltage adjustment circuit 110 receives (at 304) an indication of the current consumption from the current sensor 204. In response to the indication of the current consumption (and based on the nominal output voltage information of the converter 112), the voltage adjustment circuit 110 generates (at 306) the control indication 114. The control indication 114 is provided (at 308) to an adjustment input (such as the Trim input) of the converter 112 to adjust the output voltage provided by the converter 112. Adjusting the output voltage includes adjusting a set point of the output voltage from the converter 112 (such as through the Trim input), or otherwise changing the output voltage from the converter.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a converter to convert an input voltage to an output voltage, the converter further having a voltage set point adjustment input; and
   voltage adjustment logic to receive an indication of an electrical current consumed by a load,
   the voltage adjustment logic responsive to the indication of the consumed electrical current to provide a control indication to the voltage set point adjustment input of the converter to adjust a set point of the output voltage from the converter, wherein a voltage level of the control indication is varied by the voltage adjustment logic to provide different set points of the output voltage, the voltage level of the control indication being increased to increase the set point of the output voltage, and the voltage level of the control indication being decreased to decrease the set point of the output voltage.

2. The system of claim 1, wherein the converter comprises a DC-DC converter.

3. The system of claim 1, further comprising a current sensor to measure current consumed by the load and to generate the indication of the consumed electrical current.

4. The system of claim 1, wherein the voltage set point adjustment input comprises a Trim input.

5. The system of claim 1, wherein the voltage adjustment logic comprises an analog-to-digital converter to generate a digital value in response to the indication of consumed electrical current.

6. The system of claim 5, wherein the voltage adjustment logic further comprises control logic responsive to the digital value to generate the control indication.

7. The system of claim 6, wherein the control indication comprises an analog voltage signal whose voltage level is varied by the voltage adjustment logic, and wherein the voltage set point adjustment input is a voltage set point adjustment input pin of the converter.

8. The system of claim 7, further comprising a digital-to-analog converter between the control indication and the control logic.

9. The system of claim 6, wherein the voltage adjustment logic comprises one of a field programmable gate array, an application-specific integrated circuit device, and a digital signal processor.

10. The system of claim 1, wherein the voltage adjustment logic contains information about a nominal output voltage of the converter.

11. A method for use in a system having a converter that generates an output voltage and that has a voltage set point adjustment input, the method comprising:
    receiving an indication of current consumed by a load in the system;
    generating a control indication in response to the indication of current consumed by the load;
    providing the control indication to the voltage set point adjustment input of the converter to adjust a set point of the output voltage provided by the converter; and
    varying a voltage level of the control indication to vary the set point of the output voltage, the voltage level of the control indication being increased to increase the set point of the output voltage, and the voltage level of the control indication being decreased to decrease the set point of the output voltage.

12. The method of claim 11, further comprising:
    measuring, with a current sensor, the current consumed by the load; and
    generating, by the current sensor, the indication of the current consumed by the load.

13. The method of claim 11, further comprising feeding back the output voltage to a second adjustment input of the converter to adjust an amount of energy supplied by the converter to the output voltage.

14. The method of claim 11, wherein providing the control indication to the voltage set point adjustment input of the converter comprises providing the control indication to a Trim input of the converter.

15. The method of claim 14, wherein providing the control indication to the voltage set point adjustment input of the converter comprises providing an analog voltage signal to the adjustment input of the converter.

16. The method of claim 11, wherein providing the control indication to the voltage set point adjustment input of the converter comprises providing the control indication to the Trim input of an off-the-shelf converter.

17. The method of claim 11, further comprising detecting a change in current consumed by a load prior to detecting a change in the output voltage at the load caused by the change in current consumed by the load, wherein providing the control indication to the voltage set point adjustment input of the converter to adjust the set point of the output voltage provided by the converter is performed in response to the change in the amount of current consumed by the load rather than the change in the output voltage at the load.

18. An apparatus for use in a system having a converter to generate an output voltage from an input voltage, the converter further having a voltage set point adjustment input, the apparatus comprising:
    a current sensor to measure an electrical current consumed by a load in the system; and voltage adjustment logic to generate a control indication in response to an indication of the measured electrical current from the current sensor, the voltage adjustment logic to provide the control indication to the voltage set point adjustment input of the converter to adjust a set point of the output voltage, wherein a voltage level of the control indication is varied by the voltage adjustment logic to provide different set points of the output voltage, the voltage level of the control indication being increased to increase the set point of the output voltage, and the voltage level of the control indication being decreased to decrease the set point of the output voltage.

19. The apparatus of claim 18, wherein the voltage adjustment logic is adapted to generate the control indication in response to a change in current consumed by the load rather than to generate the control indication in response to a change in voltage level of the output voltage at the load caused by the change in current consumed by the load.

20. A system comprising:
means for measuring current consumed by a load in the system;
means for generating a control indication in response to an indication of current consumed by the load;
means for providing the control indication to voltage set point adjustment input of the converter to adjust a set point of the output voltage provided by the converter; and
means for varying a voltage level of the control indication to vary the set point of the output voltage, the voltage level of the control indication being increased to increase the set point of the output voltage, and the voltage level of the control indication being decreased to decrease the set point of the output voltage.

21. The system of claim 1, wherein the voltage adjustment logic is separate from the converter.

22. The method of claim 11, wherein providing the control indication to the voltage set point adjustment input of the converter comprises providing the control indication to a voltage set point adjustment input pin of a DC-DC converter.

23. The method of claim 22, wherein the receiving, generating, and providing are performed by a voltage adjustment logic that is separate from the DC-DC converter.

24. The apparatus of claim 18, wherein the voltage adjustment logic is separate from the converter.

* * * * *